United States Patent
Kakishima et al.

(10) Patent No.: US 10,972,168 B2
(45) Date of Patent: Apr. 6, 2021

(54) USER EQUIPMENT AND METHOD FOR WIRELESS COMMUNICATION

(71) Applicants: DOCOMO INNOVATIONS, INC., Palo Alto, CA (US); NTT DOCOMO, INC., Tokyo (JP)

(72) Inventors: Yuichi Kakishima, Tokyo (JP); Satoshi Nagata, Tokyo (JP); Chongning Na, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/075,445

(22) PCT Filed: Feb. 3, 2017

(86) PCT No.: PCT/US2017/016544
§ 371 (c)(1),
(2) Date: Aug. 3, 2018

(87) PCT Pub. No.: WO2017/136749
PCT Pub. Date: Aug. 10, 2017

(65) Prior Publication Data
US 2019/0044599 A1 Feb. 7, 2019

Related U.S. Application Data

(60) Provisional application No. 62/290,836, filed on Feb. 3, 2016.

(51) Int. Cl.
*H04B 7/06* (2006.01)
*H04L 1/00* (2006.01)
(Continued)

(52) U.S. Cl.
CPC ........... *H04B 7/0632* (2013.01); *H04B 7/063* (2013.01); *H04B 7/0639* (2013.01);
(Continued)

(58) Field of Classification Search
CPC .. H04B 7/0632; H04B 17/327; H04B 7/0639; H04B 7/063; H04L 5/0048; H04L 1/0026
(Continued)

(56) References Cited

U.S. PATENT DOCUMENTS

| 2013/0301448 A1* | 11/2013 | Sayana | H04W 24/10 370/252 |
| 2013/0301450 A1* | 11/2013 | Geirhofer | H04B 7/024 370/252 |

(Continued)

FOREIGN PATENT DOCUMENTS

| EP | 3116258 A1 | 1/2017 |
| WO | 2015/131378 A1 | 9/2015 |

(Continued)

OTHER PUBLICATIONS

3GPP TS 36.211 V 13.0.0, "3rd Generation Partnership Project; Technical Specification Group Radio Access Network; Evolved Universal Terrestrial Radio Access (E-UTRA); Physical channels and modulation (Release 13)," Dec. 2015 (141 pages).

(Continued)

*Primary Examiner* — Fitwi Y Hailegiorgis
(74) *Attorney, Agent, or Firm* — Osha Bergman Watanabe & Burton LLP

(57) ABSTRACT

A user equipment (UE) includes a receiver that receives a Reference Signal (RS) from a base station (BS), and a transmitter that transmits, to the BS, only precoding-related information used for precoding in the BS in response to the RS. The precoding-related information is at least one of a RS Resource Indicator (RRI) that identifies a radio resource used for RS BS transmission, a Precoding Matrix Indicator (PMI), a Rank indicator (RI), and a Reference Signal Received Power (RSRP). The transmitter only periodically transmits the only precoding-related information. The (Continued)

receiver receives a signal precoded using the precoding-related information by the BS.

4 Claims, 20 Drawing Sheets

(51) Int. Cl.
   *H04B 17/327* (2015.01)
   *H04L 5/00* (2006.01)
(52) U.S. Cl.
   CPC ......... *H04B 17/327* (2015.01); *H04L 1/0026* (2013.01); *H04L 5/0048* (2013.01)
(58) Field of Classification Search
   USPC .................................. 375/262; 370/352, 252
   See application file for complete search history.

(56) References Cited

U.S. PATENT DOCUMENTS

| | | |
|---|---|---|
| 2014/0241274 A1 | 8/2014 | Lee et al. |
| 2015/0215090 A1 | 7/2015 | Sayana et al. |
| 2016/0142189 A1* | 5/2016 | Shin .................. H04B 7/0626 370/329 |

FOREIGN PATENT DOCUMENTS

| | | |
|---|---|---|
| WO | 2015/176266 A1 | 11/2015 |
| WO | 2015178699 A1 | 11/2015 |
| WO | 2015/183035 A1 | 12/2015 |

OTHER PUBLICATIONS

International Search Report issued in International Application No. PCT/US2017/016544, dated Mar. 29, 2017 (4 pages).
Written Opinion issued in International Application No. PCT/US2017/016544, dated Mar. 29, 2017 (11 pages).
Office Action in corresponding Japanese Patent Application No. 2018-540830 dated Dec. 24, 2019 (6 pages).
3GPP TSG RAN WG1 Meeting #81; R1-153022; "Enhanced CSI-RS and feedback for EB/FD-MIMO" China Telecom; May 25-29, 2015; Fukuoka, Japan (5 pages).
3GPP TSG RAN WG1 Meeting #81; R1-153593; "Updated evaluation of feedback based on hybrid RS" CMCC; May 25-29, 2015; Fukuoka, Japan (5 pages).
3GPP TSG RAN WG1 Meeting #82bis: R1-155873; "Hybrid CSI-RS Mode of Operation for FD-MIMO" InterDigital; Oct. 5-9, 2015; Malmö, Sweden (2 pages).
Office Action in corresponding Japanese Patent Application No. 2018-540830 dated Oct. 15, 2019 (12 pages).
Office Action in corresponding European Patent Application No. 17704975.6 dated Oct. 23, 2019 (6 pages).
Office Action in corresponding European Patent Application No. 17704975.6 dated Apr. 24, 2020 (7 pages).

* cited by examiner ns and multiple antenna elements). Therefore, for enhancement and improvement of Channel State Information (CSI) estimation and CSI feedback in a NR system, the following points
(1) to (3) are being studied:
USER EQUIPMENT AND METHOD FOR WIRELESS COMMUNICATION

TECHNICAL FIELD

The present invention relates generally to wireless communications and, more particularly, to Channel State Information (CSI) feedback scheme in a wireless communication system.

BACKGROUND ART

It may be assumed that beamforming applied in a New Radio (NR) (fifth generation (5G)) radio access technology after Third Generation Partnership Project (3GPP) Release 13 Long Term Evolution (LTE) (Rel. 13 LTE) becomes complicated in accordance with enhancement of transmission antennas (for example, two or three dimensional antennas and multiple antenna elements). Therefore, for enhancement and improvement of Channel State Information (CSI) estimation and CSI feedback in a NR system, the following points
(1) to (3) are being studied:
(1) suppressing increase of overhead of a downlink reference signal according to enhancement of the transmission antennas, enhancing the CSI feedback, and increasing capacity of the CSI feedback;
 (1-1) three dimensional beam control according to the two or three dimensional antennas; and
 (1-2) narrowing transmission beams (increasing beam candidates) according to transmission antennas having multiple antenna elements;
(2) reducing load of channel estimation and battery consumption in a user equipment and reducing signal processing load and power consumption in a base station; and
(3) flexible adaptation in different duplexes (for example, Frequency Division Duplex (FDD), Time Division Duplex (TDD), and enhanced TDD (eTDD)), different frequency bands, and different deployment scenarios.

For example, in a wireless communication system, candidates of the beams (precoders) may increase due to an increase of the antenna elements of a base station. In the NR system, it may be possible to form a sharp beam using multiple antenna elements of the BS, whereas consideration of an increase of overhead of Channel State Information-Reference Signals (CSI-RSs) and CSI feedback and implementation of a BS and a user equipment may be required due to a significant increase of candidates of the beams (precoders). For example, loads on the user equipment may be increased in operations for CSI estimation and CSI feedback based on legacy LTE standards.

CITATION LIST

Non-Patent Reference

[Non-Patent Reference 1] 3GPP, TS 36.211 V 13.0.0

SUMMARY OF THE INVENTION

According to one or more embodiments of the present invention, a user equipment (UE) may comprise a receiver that receives a Reference Signal (RS) from a base station (BS), and a transmitter that transmits, to the BS, only precoding-related information (beam-related information) used for precoding in the BS in response to the RS.

According to one or more embodiments of the present invention, a UE may comprise a receiver that receives a RS from a BS, and a transmitter that transmits, to the BS, feedback information (e.g., only precoding-related information) without Channel Quality Indicator (CQI) calculated using the RS.

According to one or more embodiments of the present invention, a UE may comprise a receiver that receives a RS from a BS, and a transmitter that transmits, to the BS, only a CQI calculated using the RS.

According to one or more embodiments of the present invention, a UE may comprise a receiver that receives a RS from a BS, and a transmitter that transmits, to the BS, feedback information (e.g., only CQI) without precoding-related information.

According to one or more embodiments of the present invention, a method for wireless communication may comprise receiving, with a UE, a first RS from a BS, transmitting, from the UE to the BS, a first part of predetermined indicators of CSI in response to the first RS, receiving, with the UE, a second RS from the BS, and transmitting, from the UE to the BS, a second part of the predetermined indicators different from the first part in response to the second RS.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, a Channel State Information-Reference Signal (CSI-RS) is an example of a reference signal. A CSI-RS Resource Indicator (CRI) is an example of a RS Resource Indicator indicating a radio resource (beam) used for the RS transmission. Furthermore, in one or more embodiments of the present invention, the CRI may be referred to as a Beam Index (BI) or an Antenna Port (AP).

Figure 1:
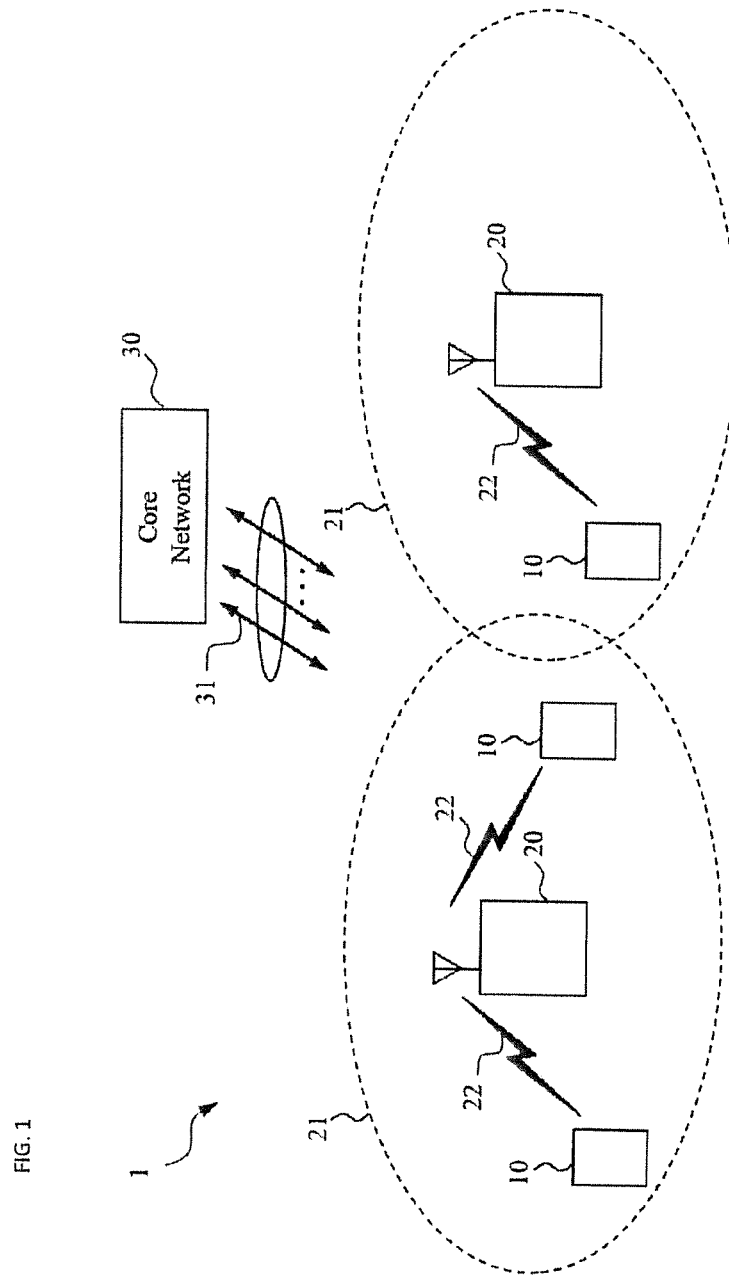
FIG. 1 is a diagram showing a configuration of a wireless communication system according to one or more embodiments of the present invention.

FIG. 1 illustrates a wireless communications system 1 according to one or more embodiments of the present invention. The wireless communication system 1 includes User Equipments (UEs) 10, Base Stations (BSs) 20, and a core network 30. The wireless communication system 1 may be an LTE/LTE-Advanced (LTE-A) system or a New Radio (NR) (fifth generation (5G) radio access technology) system supporting a beamforming mechanism. The wireless communication system 1 is not limited to the specific configurations described herein and may be any type of wireless communication system supporting the beamforming mechanism.

The BS 20 may communicate uplink (UL) and downlink (DL) signals with the UE(s) 10 in coverage via multiple antenna ports (APs) using MIMO technology. The DL and UL signals include control information and user data. The BS 20 may communicate DL and UL signals with the core network 30 through backhaul links 31. The BS 20 may be Evolved NodeB (eNB) or a base station for the NR system.

The BS 20 includes one or more antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 communicates DL and UL signals that include control information and user data with the BS 20 using MIMO technology. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

Figure 2:
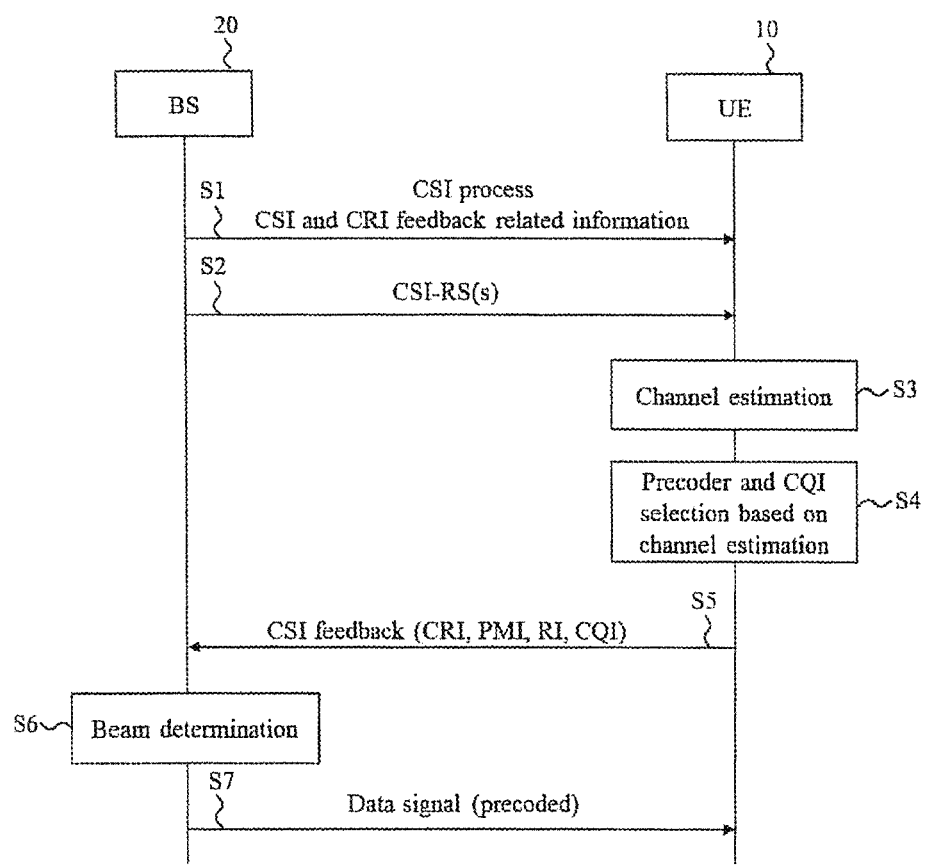
FIG. 2 is a sequence diagram showing an example operation for precoder selection and beam determination based on conventional channel estimation.

First, a conventional Channel State Information (CSI) feedback scheme will be described with reference to FIG. 2. As shown in FIG. 2, the BS 20 may transmit CSI process information and the CSI-RS to the UE 10 (steps S1 and S2).

The UE 10 may perform the channel estimation based on the received CSI-RS (step S3), and then select the precoder and Channel Quality Information (CQI) based on a result of the channel estimation (step S4). The UE 10 may transmit the CSI feedback including the selected precoder (Precoding Matrix Indicator (PMI)), the CRI, a Rank Indicator (RI), a Reference Signal Received Power (RSRP), and the CQI to the BS 20 (step S5). The BS 20 may determine a beam used for data signal transmission between the BS 20 and the UE 10 based on the received CSI feedback (step S6). The BS 20 may transmit a precoded data signal using the determined beam to the UE 10 (step S7).

Thus, in the conventional CSI feedback scheme, the UE 10 transmits the CSI including the CRI, the PMI, the RI, and the CQI at once. In other words, in the conventional CSI feedback scheme, overheads of the CSI feedback may be large in each CSI feedback operation. As a result, loads on the UE 10 may increase in the CSI feedback scheme based on legacy LTE standards.

First Example

Embodiments of a first example of the present invention will be described in detail below. According to one or more embodiments of the first example of the present invention, in a CSI feedback scheme, the UE 10 may transmit only precoding-related information of the CSI to the BS 20. The precoding-related information is information used for precoding in the BS 20.

Figure 3A:
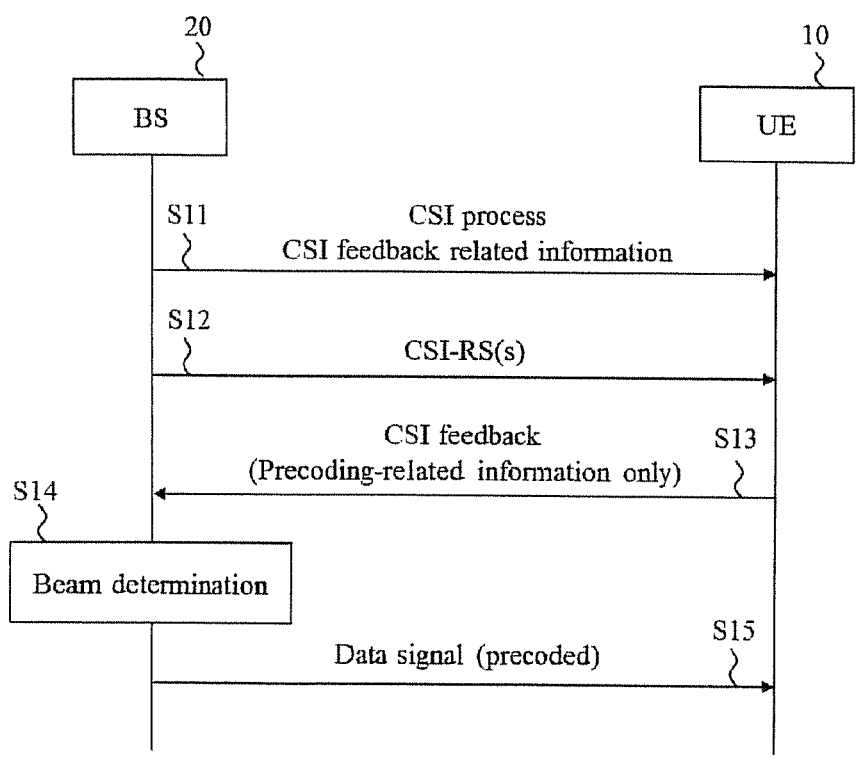
FIG. 3A is a sequence diagram showing an example operation for a CSI feedback scheme according to one or more embodiments of a first example of the present invention.

FIG. 3A is a sequence diagram showing an example operation for a CSI feedback scheme according to one or more embodiments of the first example of the present invention.

As shown in FIG. 3A, the BS 20 may transmit CSI process information (CSI feedback related information) to the UE 10 (step S11). The CSI process information includes each of K CSI-RS resources, which may correspond to each of K beams or information of the CSI-RS resources, which may be information of K beams. For example, the CSI process information includes information on the number of CSI-RS resources and APs (streams) corresponding to the CSI-RS resources. For example, the number of the CSI-RS resources may correspond to the number of beams (rank) or the number of APs of the CSI-RS may correspond to the number of beams.

In one or more embodiments of the first example of the present invention, for example, the CSI process information may include at least one of the number of the CSI-RS processes and APs corresponding to the CSI-RS resources. For example, the CSI process information may be notified, from the BS 10 to the UE 10, via higher layer signaling (e.g., Radio Resource Control (RRC) signaling), lower layer signaling, or a combination of the higher layer signaling and the lower layer signaling. For example, the BS 20 may notify the UE 10 of at least one candidate of CSI-RS reception via the higher layer signaling (e.g., RRC signaling and broadcast signals). For example, the BS 20 may trigger (switch) the higher layer signaling, the lower layer signaling, and the combination of the higher layer signaling and the lower layer signaling using dynamic signaling. The dynamic signaling may be, for example, signaling using Physical Downlink Control Channel (PDCCH) and signaling using Enhanced PDCCH (ePDCCH) multiplexed in a Physical Downlink Shared Channel (PDSCH) region.

The BS 20 may transmit one or more CSI-RSs (step S12). Furthermore, the BS 20 may transmit one or more Synchronization Signals (SSs) and/or a predetermined Reference Signals (RSs) rather than the CSI-RSs.

The UE 10 may receive the CSI-RSs from the BS 20. Then, the UE 10 may generate the CSI feedback including only precoding-related information (beam related information) out of the predetermined indicators based on the received CSI-RSs. The predetermined indicators may be the CRI, the PMI, the RI, the CQI, and the RSRP. The precoding-related information may be at least one of the CRI, the PMI, the RI, and the RSRP. The precoding-related information may not include the CQI. A parameter of each of predetermined indicators may be selected based on the CSI-RSs. The UE 10 may transmit the CSI feedback including the only precoding-related information to the BS 20 (step S13).

Furthermore, only periodic CSI feedback may be supported. For example, at the step 13, the UE 10 may only periodically transmit the only precoding-related information to the BS 20.

The BS 20 may determine the precoder based on the received the only precoding-related information and then determine the beam used for the downlink MIMO transmission (step S14).

The BS 20 may transmit the beamformed (BF) CSI-RS (precoded CSI-RS) to the UE 10 using the determined beam (step S15). Furthermore, beamforming (precoding) may not be applied to the CSI-RS transmitted at the step S15. Furthermore, the BS 20 may transmit a precoded data signal at the step S105.

Thus, according to a CSI feedback scheme in one or more embodiments of the first example of the present invention, the only precoding-related information may be transmitted from the UE 10 to the BS 20. In other words, according to one or more embodiments of the present invention, the UE 10 may transmit feedback information (e.g., only precoding-related information) without the CQI calculated using the RS. As a result, loads for the CSI feedback can be reduced compared to the conventional scheme in which the CSI feedback includes the CQI.

Figure 3B:
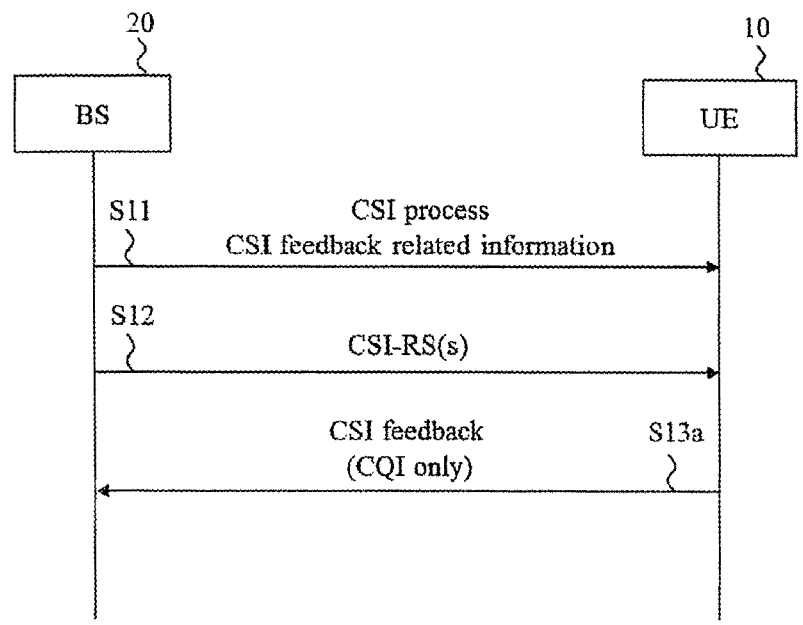
FIG. 3B is a sequence diagram showing an example operation for a CSI feedback scheme according to one or more embodiments of another example of the first example of the present invention.

FIG. 3B is a sequence diagram showing an example operation for a CSI feedback scheme according to one or more embodiments of another example of the first example of the present invention. Similar steps in FIG. 3B to steps in FIG. 3A may have the same reference label.

At a step S13a in FIG. 3B, the UE 10 may transmit only a CQI calculated using the received CSI-RS. Furthermore, only aperiodic CSI feedback may be supported. For example, at the step 13a, the UE 10 may only aperiodically transmit the only CQI to the BS 20.

Thus, according to a CSI feedback scheme in one or more embodiments of another example of the first example of the present invention, the only CQI may be transmitted from the UE 10 to the BS 20. In other words, according to one or more embodiments of the present invention, the UE 10 may transmit feedback information (e.g., only CQI) without the precoding-related information. As a result, loads for the CSI feedback can be reduced compared to the conventional scheme.

First Modified Example

According to one or more embodiments of a first modified example of the present invention, CSI feedback may be performed in a step-by-step manner. For example, in one or more embodiments of the first modified example of the present invention, the UE 10 may transmit a part of predetermined indicators of the CSI to the BS 20 at a first step, and then, the UE 10 may transmit another part of the predetermined indicators of the CSI. The predetermined indicators may be the CRI, the PMI, the RI, the CQI, and the RSRP.

Figure 4:
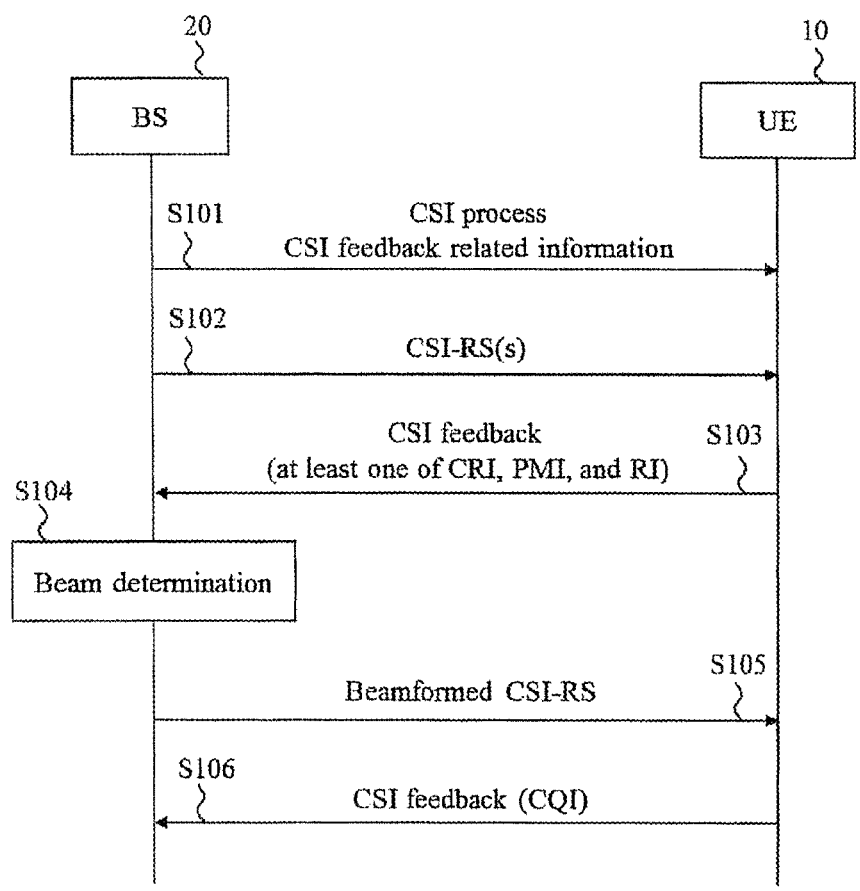
FIG. 4 is a sequence diagram showing an example operation for a CSI feedback scheme according to one or more embodiments of a first modified example of the present invention.

FIG. 4 is a sequence diagram showing an example operation for a CSI feedback scheme according to one or more embodiments of the first modified example of the present invention.

As shown in FIG. 4, the BS 20 may transmit CSI process information (CSI feedback related information) to the UE 10 (step S101).

In one or more embodiments of the first modified example of the present invention, for example, the CSI process information may include at least one of the number of the CSI-RS processes and APs corresponding to the CSI-RS resources. For example, the CSI process information may be notified, from the BS 10 to the UE 10, via higher layer signaling (e.g., Radio Resource Control (RRC) signaling), lower layer signaling, or a combination of the higher layer signaling and the lower layer signaling. For example, the BS 20 may notify the UE 10 of at least one candidate of CSI-RS reception via the higher layer signaling (e.g., RRC signaling and broadcast signals). For example, the BS 20 may trigger (switch) the higher layer signaling, the lower layer signaling, and the combination of the higher layer signaling and the lower layer signaling using dynamic signaling. The dynamic signaling may be, for example, signaling using Physical Downlink Control Channel (PDCCH) and signaling using Enhanced PDCCH (ePDCCH) multiplexed in a Physical Downlink Shared Channel (PDSCH) region.

The BS 20 may transmit one or more CSI-RSs (step S102). Furthermore, the BS 20 may transmit one or more Synchronization Signals (SSs) and/or a predetermined Reference Signals (RSs) rather than the CSI-RSs.

The UE 10 may receive the CSI-RSs from the BS 20. Then, the UE 10 may generate a first part of predetermined indicators (e.g., CRI, PMI, RI, CQI, and RSRP) of the CSI based on the received CSI-RSs. For example, the first part includes only precoding-related information (beam related information) of the predetermined indicators. The precoding-related information may be at least one of the CRI, the PMI, the RI, and the RSRP. For example, first part may not include the CQI. The UE 10 may transmit the first part of the CSI to the BS 20 (step 103). Furthermore, in one or more embodiments of the first modified example of the present invention, in transmission of the first part, only periodic CSI feedback may be supported. For example, at the step 103, the UE 10 may only periodically transmit the first part of the CSI to the BS 20.

The BS 20 may determine the precoder based on the received CSI feedback and then determine the beam used for the downlink MIMO transmission (step S104).

The BS 20 may transmit the beamformed (BF) CSI-RS (precoded CSI-RS) to the UE 10 using the determined beam (step S105). Furthermore, beamforming (precoding) may not be applied to the CSI-RS transmitted at the step S105. Furthermore, the BS 20 may transmit multiple CSI-RSs at the step S105.

The UE 10 may transmit a second part of the predetermined indicators (e.g., CRI, PMI, RI, CQI, and RSRP) of the CSI as CSI feedback based on the BF CSI-RS from the BS 20 (step S106). The second part of the predetermined indicators is different from the first part of the predetermined indicators. For example, the second part may be the CQI. Furthermore, for example, when the first part is the CRI, the PMI, the RI, and RSRP, the second part may be the CQI, the PMI, and the RI. Furthermore, in one or more embodiments of the first modified example of the present invention, in transmission of the second part, only aperiodic CSI feedback may be supported. For example, at the step 106, the UE 10 may only aperiodically transmit the second part of the CSI to the BS 20.

For example, the UE 10 may calculate the CQI by assuming the received power of the CSI-RS as the received power of a desired signal. Furthermore, for example, when a power offset (from other signals/channels) is used for the CSI-RS, the CQI may be calculated in consideration of the power offset.

Figure 5A:
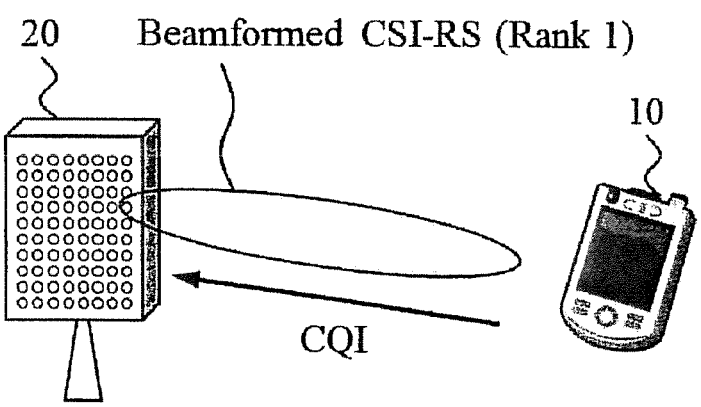
FIG. 5A is a diagram showing CQI transmission in response to a Rank 1 beamformed CSI-RS according to one or more embodiments of the first modified example of the present invention.
Figure 5B:
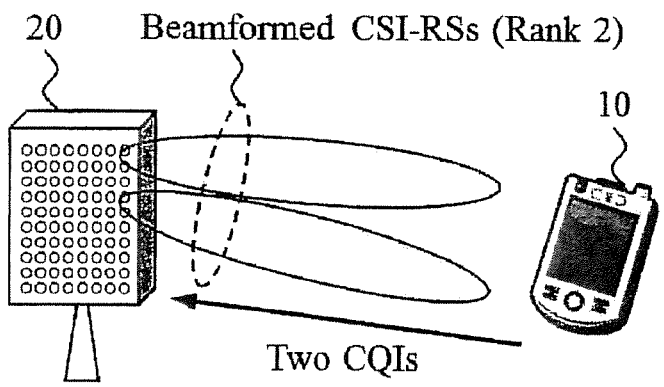
FIG. 5B is a diagram showing CQI transmission in response to Rank 2 beamformed CSI-RSs according to one or more embodiments of the first modified example of the present invention.

For example, at the step S106, as shown in FIGS. 5A and 5B, the CSI feedback may include the CQI for each stream (or each AP) of the CSI-RS. As shown in FIG. 5A, in response to a Rank 1 (one beam) BF CSI-RS, the UE 10 may transmit the CQI for one beam to the BS 20. On the other hand, as shown in FIG. 5B, in response to a Rank 2 (two beams) BF CSI-RSs, the UE 10 may the CQI for each of two beams to the BS 20.

As another example, at the step S106, the UE 10 may transmit the CQI included in the CSI feedback as a Differential CQI. In such case, the CSI-RS transmission in descending order (or ascending order) of the reception quality may be sorted (indexed) so that values of the Differential CQI do not include positive values (or negative values). Furthermore, for example, values of the Differential CQI may be asymmetric (the number of candidates of positive values (or negative values) is large).

For example, when the UE 10 calculates the CQI of a predetermined stream (AP), the CQI may be calculated as streams (APs) other than an own stream (own AP) as an interference component (interference between streams). As another example, the UE 10 may calculate the CQI using a part of streams (e.g., a part of APs) as the interference component. Furthermore, for example, the BS 20 may transmit a signal regarding interference calculation conditions (for example, which stream (AP) is estimated as the interference) to the UE 10.

Thus, in the CSI feedback scheme according to one or more embodiments of the first modified example of the present invention, at the first step, the UE 10 may transmit a first part (e.g., at least one of the CRI, the PMI, the RI, and the RSRP) of the predetermined indicators (the CRI, the PMI, the RI, the RSRP, and the CQI) of the CSI to the BS 20 in response to at least one first CSI-RS from the BS 20. Then, at the second step, the UE 10 may transmit a second part (e.g., CQI) of the predetermined indicators of the CSI different from the first part to the BS 20 in response to a second CSI-RS from the BS 20. For example, the first part of the predetermined indicators may be only precoding-related information to be used for precoding the second CSI-RS in the BS 20. For example, the first CSI-RS(s) and the second CSI-RS may be associated with the same CSI process. For example, configuration information on the first CSI acquisition and the second CSI acquisition may be signaled with a single CSI process. For example, the CSI process may include the configuration information used for transmission of the first part and the second part.

According to one or more embodiments of the first modified example of the present invention, overhead of the CSI feedback can be reduced in each CSI feedback operation by applying the CSI feedback scheme using the step-by-step manner.

Another Example of the First Modified Example

Figure 6:
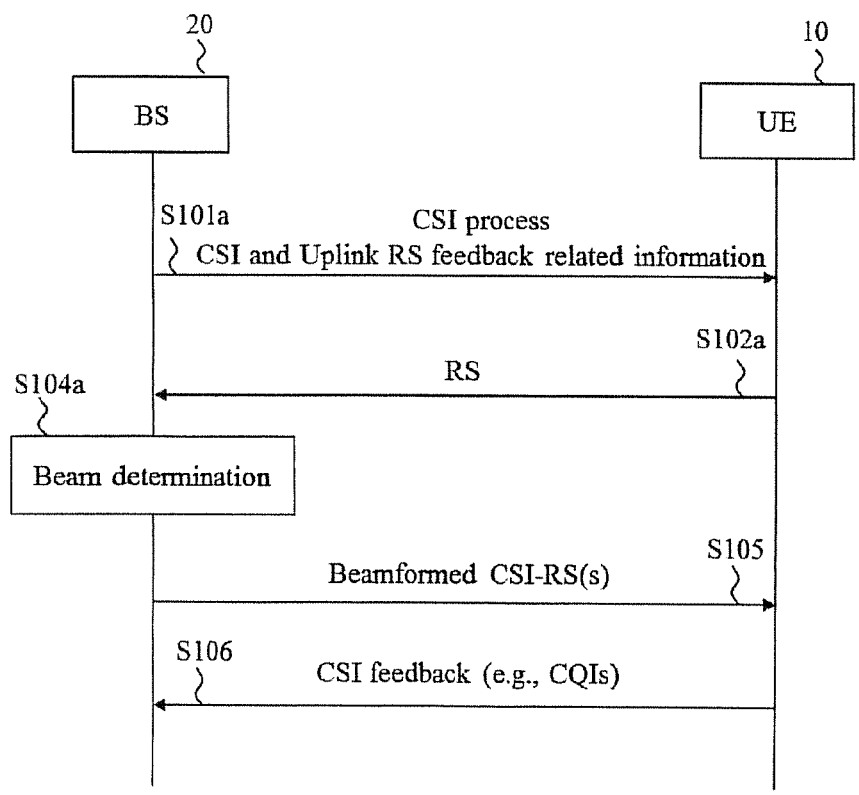
FIG. 6 is a sequence diagram showing an example operation for a CSI feedback scheme according to one or more embodiments of another example of the first modified example of the present invention.

FIG. 6 is a sequence diagram showing an example operation for CSI feedback scheme according to one or more embodiments of another example of the modified first example of the present invention. Similar steps in FIG. 6 to steps in FIG. 4 may have the same reference labels and explanations thereof will be omitted.

Figure 8:
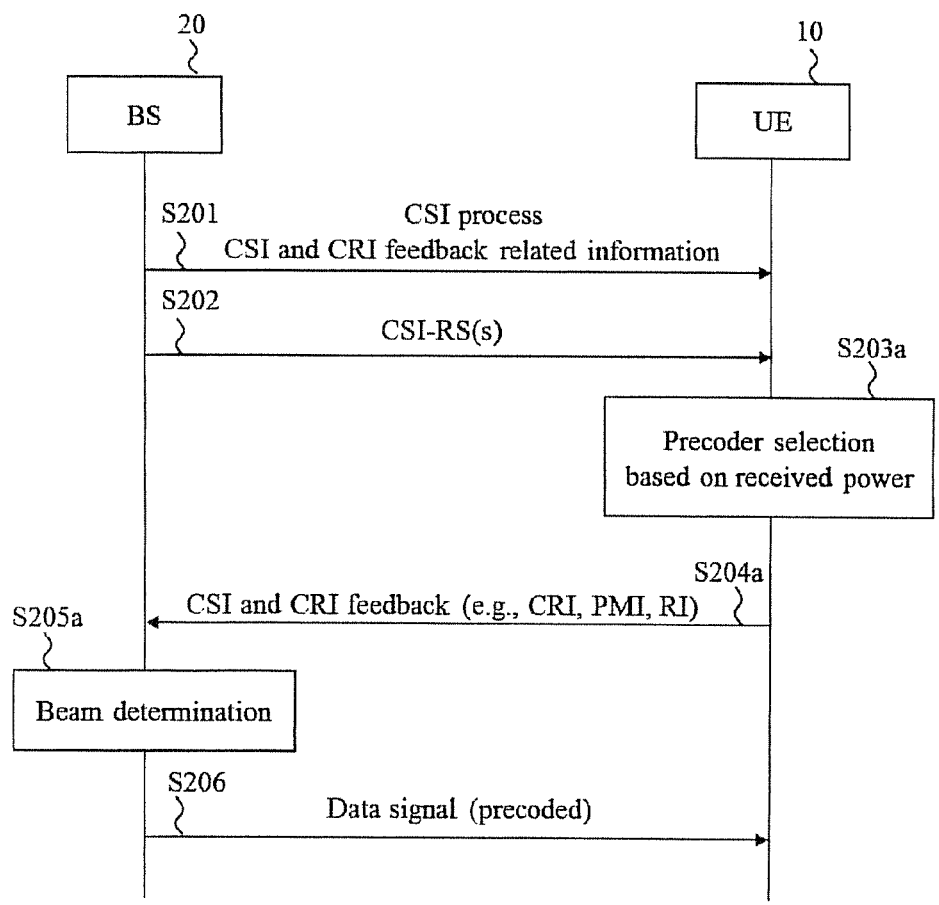
FIG. 8 is a sequence diagram showing an example operation for a CSI feedback scheme according to one or more embodiments of a second modified example of the present invention.

As shown in FIG. 6, the BS 20 may transmit the CSI process information (CSI and Uplink RS feedback related information) to the UE 10 (step S101a). The UE 10 may the RS to the BS 20 (step S102a). The BS 20 may determine the precoder based on the channel reciprocity of the received RS and then determine the beam used for the downlink MIMO transmission (step S104a). Steps after the step S104a in FIG. 8 are the same as the steps in FIG. 6.

Thus, according to one or more embodiments of the first modified example of the present invention, when the precoder is determined based on the channel reciprocity, overhead of the CSI feedback may be reduced due to the CSI feedback including only the CQI. Furthermore, when the direction of arrival of the beam is estimated based on advance information of the CSI such as the channel reciprocity, the CSI feedback may include the CQI and information on phase difference between polarizations. As a result, overhead of feedback of information on a phase between the same polarized antennas can be reduced.

As another example, in the above embodiments of the first and the first modified examples of the present invention, although a part of the predetermined indicators of the CSI may be transmitted from the UE 10 to the BS 20 in each CSI feedback operation, a part of the predetermined indicators of the CSI used for CSI feedback information may be switched according to purposes. For example, the CSI feedback information including only the precoding-related information, the CSI feedback information including only the CQI, and the CSI feedback information including both the precoding-related information and the CQI may be switched dynamically or semi-statically. For example, the CSI feedback information above may be switched based on the CSI (for example, interference information, MU-MIMO related CSI). For example, the CSI feedback information may be designated for each CSI process or may be determined for each different CSI process implicitly.

For example, the CSI feedback used according to the different purposes above may be configured as a single CSI process. For example, CSI measurement information for the beam selection and CSI measurement information for CQI selection may be separately configured in the CSI process. For example, information configured in the CSI process may include information defined in Rel. 13 LTE.

As another example, in the above embodiments of the first and the first modified examples of the present invention, for example, the CSI-RS may not be beamformed. For example, the BS 20 may transmit the NP CSI-RS and the PMI to the UE 10, and then the UE 10 may calculate the CQI based on the transmitted NP CSI-RS and PMI.

As another example, in the above embodiments of the first and the first modified examples of the present invention, the channel estimation may be performed using the channel reciprocity of uplink and downlink channels. The channel estimation using channel reciprocity may be effective in a Time Division Duplex (TDD) system. The channel reciprocity indicates a transpose relation of an uplink channel matrix and a downlink channel matrix.

Second Example

Figure 7:
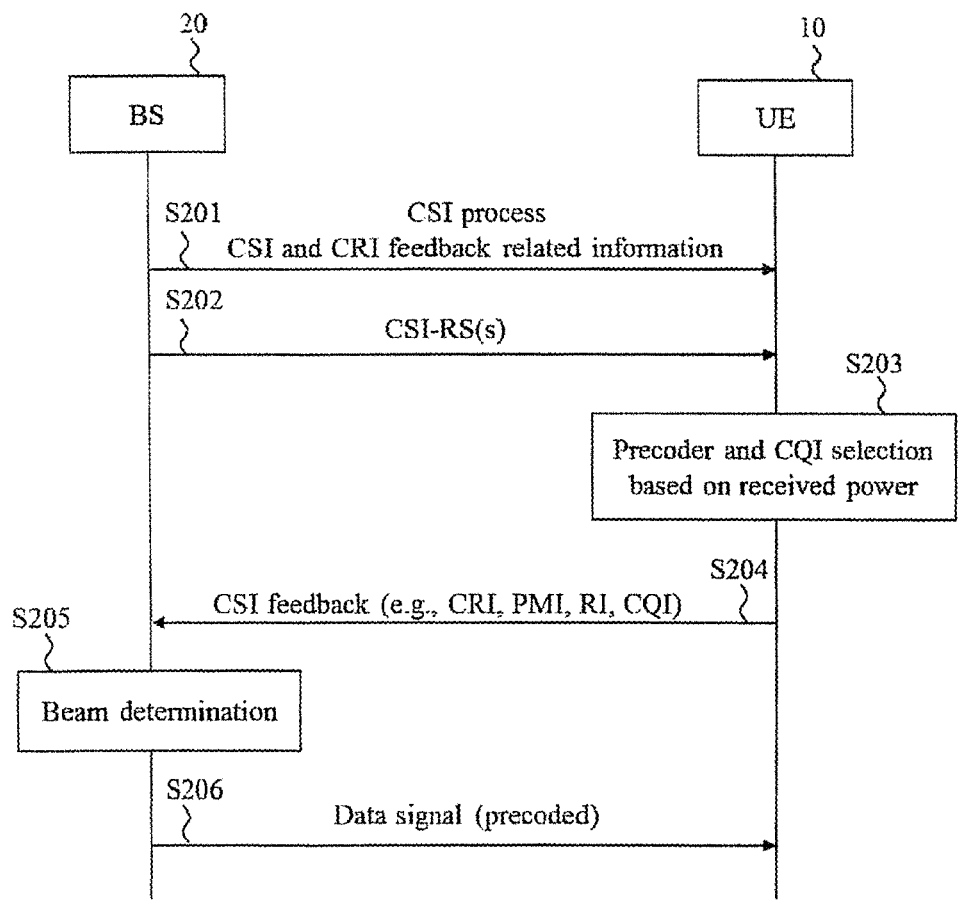
FIG. 7 is a sequence diagram showing an example operation for a CSI feedback scheme according to one or more embodiments of a second example of the present invention.

According to one or more embodiments of the second example of the present invention, the UE 10 does not perform the channel estimation and may select the precoder (e.g., CRI) based on received power of a received signal. FIG. 7 is a sequence diagram showing an example operation for beam determination according to one or more embodiments of the second example of the present invention.

The BS 20 may set K CSI processes for K precoded CSI-RSs. Then, the BS 20 may transmit the CSI process information (CSI and CRI feedback related information) to the UE 10 (step S201). The CSI process information is information on the K CSI processes corresponding to K beams, respectively. For example, the CSI process information includes information on the number of CSI processes and APs (streams) corresponding to the CSI processes. For example, the CSI process information may be notified, from the BS 20 to the UE 10, using higher layer signaling, lower layer signaling, or a combination of the higher layer signaling and the lower layer signaling.

The BS 20 may transmit the CSI-RSs to the UE 10 (step S202). Each of the CSI-RSs may be precoded and correspond to a predetermined beam.

The UE 10 may receive the CSI-RS from the BS 20. Then, the UE 10 may select the precoder (e.g., CRI) and the CQI from a codebook based on only received power of the received CSI-RS (step S203). For example, the received power may be Reference Signal Received Power (RSRP)) measured by the UE 10. For example, the received power may be calculated based on power. For example, the received power may be calculated based on power at a certain time-frequency location such as a Received Signal Strength Indicator (RSSI) or other methods. Thus, in one or more embodiments of the second example of the present invention, the UE 10 may not perform the channel estimation.

The UE 10 may the CSI feedback to the BS 20 (step S204). The CSI feedback may include for example, the CRI, the PMI, a Rank Indicator (RI), and the CQI.

The BS 20 may receive the CSI feedback from the UE 10. Then, the BS 20 may determine the precoder based on the CSI feedback and determine (select) the beam used for downlink MIMO transmission (step S205).

The BS 20 may transmit the precoded data signal using the determined beam to the UE 10 (step S206).

Thus, the UE 10 according to one or more embodiments of the second example of the present invention may perform precoding (PMI) selection based on the received power of the received CSI-RS. That is, it is not necessary to perform the channel estimation before the precoding selection. Therefore, according to one or more embodiments of the second example of the present invention, for example, even if multiple antenna elements of the base station cause candidates of the beams (precoders) to be increased, it may be possible to reduce processing load of the UE 10 and to make implementation of functions in the UE 10 easier. As a result, in the wireless communication system 1 according to one or more embodiments of the second example of the present invention, it may be possible to perform beam selection easily. Furthermore, by the BS 20 switching, with time, the beam the BS 20 causes the UE 10 to measure, the UE can measure quality of a plurality of different beams without advance notification to the UE 10.

Second Modified Example

According to one or more embodiments of a second modified example of the present invention, for example, in the precoding selection based on only the received power, the UE 10 may transmit the CSI feedback including only the precoding-related information to the BS 20. For example, the precoding-related information may include the CRI, the PMI, and the RI.

FIG. 8 is a sequence diagram showing an example operation for beam determination according to one or more embodiments of the modified second example of the present invention. Similar steps in FIG. 8 to steps in FIG. 7 may have the same reference label.

As shown in FIG. 8, the UE 10 may select the precoder (for example, the CRI) from the codebook based on only the received power of the received CSI-RS (step S203*a*). Then, the UE 10 may transmit the CSI feedback including the precoding-related information (for example, the CRI, the PMI and the RI) to the BS 20 (step S204*a*). Thus, according to one or more embodiments of the second modified example of the present invention, the CSI feedback may not include the CQI. Furthermore, the UE 10 may not select the CQI.

The BS 20 may determine the precoder using only the precoding-related information (for example, the CRI, the PMI, and the RI) included in the received CSI feedback and then determine the beam used for the downlink MIMO transmission (step S205*a*).

Thus, according to one or more embodiments of the second modified example of the present invention, overhead of the CSI feedback can be reduced since the CSI feedback does not include the CQI.

For example, in an approach to step-by-step performing the beam determination according to the wireless communication system 1, the BS 20 may roughly determine the beam (beam direction) in an initial step and then determine the beam in more detail in a next step. For example, in the wireless communication system 1, a paired user for Multi User MIMO (MU-MIMO) may be determined based on rough information on the beam. For example, in the wireless communication system 1, the CQI may be determined based on information on the beam and user pairing. As described above, the beam determination, the user pairing, and the CQI determination may be step-by-step performed. For example, it may be effective that CSI acquisition in a first step may be periodically performed with low frequency in a broader band and CSI acquisition in a latter step may be aperiodically performed with high frequency in a narrower band. For example, a CSI feedback scheme according to one or more embodiments of the second modified example of the present invention may be applied to the initial step in which the beam is roughly determined. For example, the CSI feedback scheme according to one or more embodiments of the second modified example of the present invention may support only broadband feedback or only periodic reporting.

Another Example of the Second Example

As another example, APs of the CSI-RS set for the CSI feedback may be restricted. For example, 1-Tx or 2-Tx transmission may be enough to estimate simple channel information such as the received signal strength and a direction of arrival. For example, in the 2-Tx transmission, each of APs may apply polarization different from each other.

As another example, different beams may be multiplexed as APs. Furthermore, for example, the UE 10 may transmit feedback information on the beam selection as an AP index. Furthermore, for example, the CSI-RS or newly defined signals may be used for the beam selection. A format of the feedback information may be a format of the CRI, the PMI, or other formats. Furthermore, for example, components in the feedback information may be grouping information components, one or more information components. For example, the feedback information may include components with good characteristics (e.g., reception quality) or components with bad characteristics. Furthermore, for example, the grouping information may be the grouped PMIs or the grouped CRIs.

Third Example

Embodiments of a third example of the present invention will be described in detail below. In MU-MIMO where a transmission information sequence is simultaneously transmitted from different transmission antennas to the different users, interference between streams (users) may greatly affect transmission characteristics. Therefore, it may be important to measure (estimate) the interference between the users in the MU-MIMO. On the other hand, the BS 20 may transmit the BF CSI-RS based on advance channel information (for example, channel reciprocity and CSI feedback (including CRI).

According to one or more embodiments of the third example of the present invention, the BS 20 may transmit the MU BF CSI-RSs to the UEs 10 paired as multi user pairing for the MIMO transmission after determining the beams for a plurality of users. Then, each of the paired UEs 10 may estimate the interference between UEs based on the MU BF CSI-RS.

Figure 9:
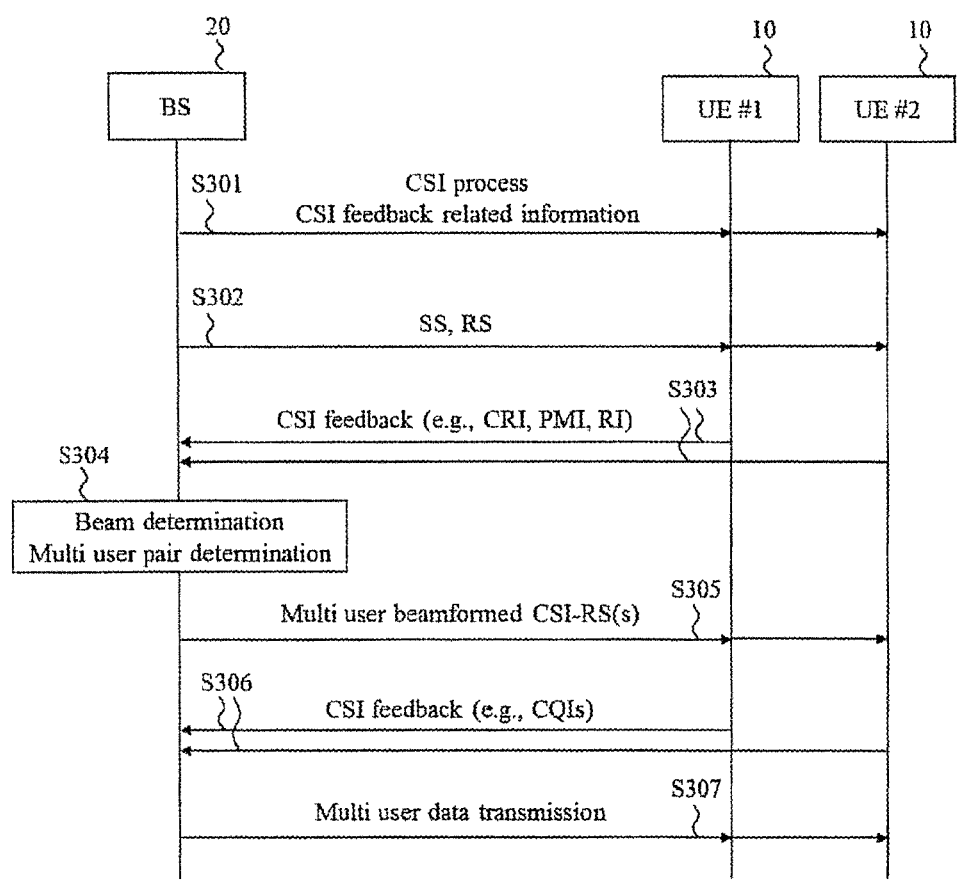
FIG. 9 is a sequence diagram showing an example operation for a CSI feedback scheme according to one or more embodiments of a third example of the present invention.

FIG. 9 is a sequence diagram showing an example operation for a CSI feedback scheme according to one or more embodiments of the third example of the present invention. An example of MU-MIMO of the two UEs 10 (UE #1 and UE #2) will be described below with reference to FIG. 9. However, the number of the UEs 10 is not limited to two, but the number of the UEs 10 may be predetermined numbers.

As shown in FIG. 9, the BS 20 may transmit CSI process information (CSI feedback related information) to the UEs 10 (UE #1 and UE #2) (Step S301).

In one or more embodiments of the third example of the present invention, for example, the CSI process information may include at least one of the number of the CSI-RS processes and the number of CSI-RS resources and APs corresponding to the CSI processes. The CSI process information may be notified, from the BS 20 to the UE 10, via the higher layer signaling, the lower layer signaling, or the combination of the higher layer signaling and the lower layer signaling.

The BS 20 may transmit the SSs and the RSs to the UEs 10 (UE #1 and UE #2) (step S302).

The UEs 10 (UE #1 and UE #2) may receive the SS and the RS from the BS 20. Then, the UE 10 (UE #1 and UE #2) may generate the CSI feedback including the CRI, the PMI, and the RI based on the received SS and RS. The UE 10 may transmit the CSI feedback including the CRI, the PMI, and the RI to the BS 20 (step S303).

The BS 20 may determine the precoder for each of the UEs 10 (UE #1 and UE #2) based on the received CSI feedback and then determine the beam used for the downlink MIMO transmission. The BS 20 may determine the UE #1 and the UE #2 as a pair of the multi user for the MU-MIMO transmission (step S304).

The BS 20 may transmit the MU BF CSI-RS to the UEs 10 (UE #1 and UE #2) using the determined beam (step S305). In one or more embodiments of the third example of the present invention, the MU BF CSI-RS may be used for the channel estimation between the BS 20 and its own user equipment (the own UE 10) and estimation of interference between UEs by the UE 10.

Figure 10:
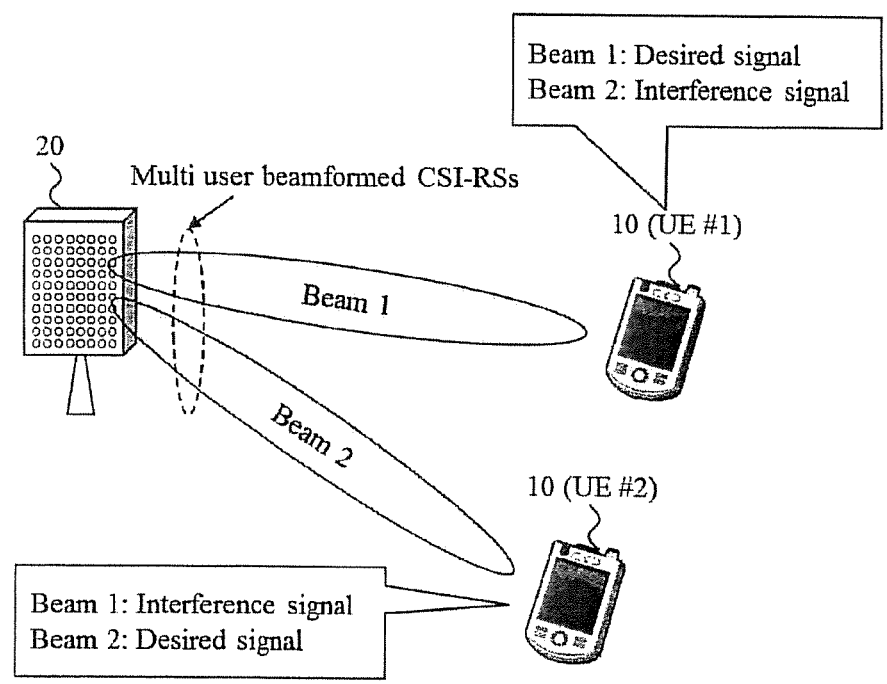
FIG. 10 is a diagram showing a relation between beams for multi-user beamformed CSI-RSs and UEs according to one or more embodiments of the third example of the present invention.

The UEs 10 (UE #1 and UE #2) may receive the MU BF CSI-RS from the BS 20. In one or more embodiments of the third example of the present invention, as shown in FIG. 10, the UE #1 may estimate a part (CSI-RS of Beam 1) of the MU BF CSI-RSs as a signal for its own user equipment (UE #1) and estimate the other part (CSI-RS of Beam 2) as a signal for other user equipment (interference signal). On the other hand, the UE #2 may estimate a part (CSI-RS of Beam 2) of the MU BF CSI-RSs as a signal for its own user equipment (UE #2) and estimate the other part (CSI-RS of Beam 1) as a signal for other user equipment (interference signal).

In one or more embodiments of the third example of the present invention, for example, the BS 20 may notify the UE 10 of information to identify the signal for its own UE 10 and the signal for other UE 10 of the MU BF CSI-RSs (identification information) may be notified to the UE 10. For example, the identification information may be notified to the UE 10 as the AP index or as necessity of interference signal calculation.

As shown in FIG. 9, the UE 10s (UE #1 and UE #2) may perform the CSI estimation based on a result of the received MU BF CSI-RSs from the BS 20 and then transmit the CSI feedback including only the CQI to the BS 20 (step S306). For example, the UE 10 may receive the MU BF CSI-RS and then if the UE 10 assume (determine) the precoder is determined in the BS 20, the UE 10 may transmit the CSI feedback including only the CQI.

For example, at the step S306, the CSI feedback may include the CSI (for example, CQI) for each stream (or each AP) of the BF CSI-RS. In such case, the BS may dynamically transmit the number of the streams (the number of the APs) to the UE 10 simultaneously or before the BS 20 may transmit the BF CSI-RS.

The BS 20 may perform multi user data transmission to the UEs 10 (UE #1 and UE #2) which are determined as the pair of multi users (step S307).

Thus, according to one or more embodiments of the third example of the present invention, the BS 20 may transmit the MU BF CSI-RSs to measure the interference between the UEs to the UE 10 after the beam determination of the multiple users based on the CSI feedback, and as a result, it may be possible to perform the CSI estimation in consideration of the interference between UEs in the MU-MIMO transmission.

Third Modified Example

Figure 11:
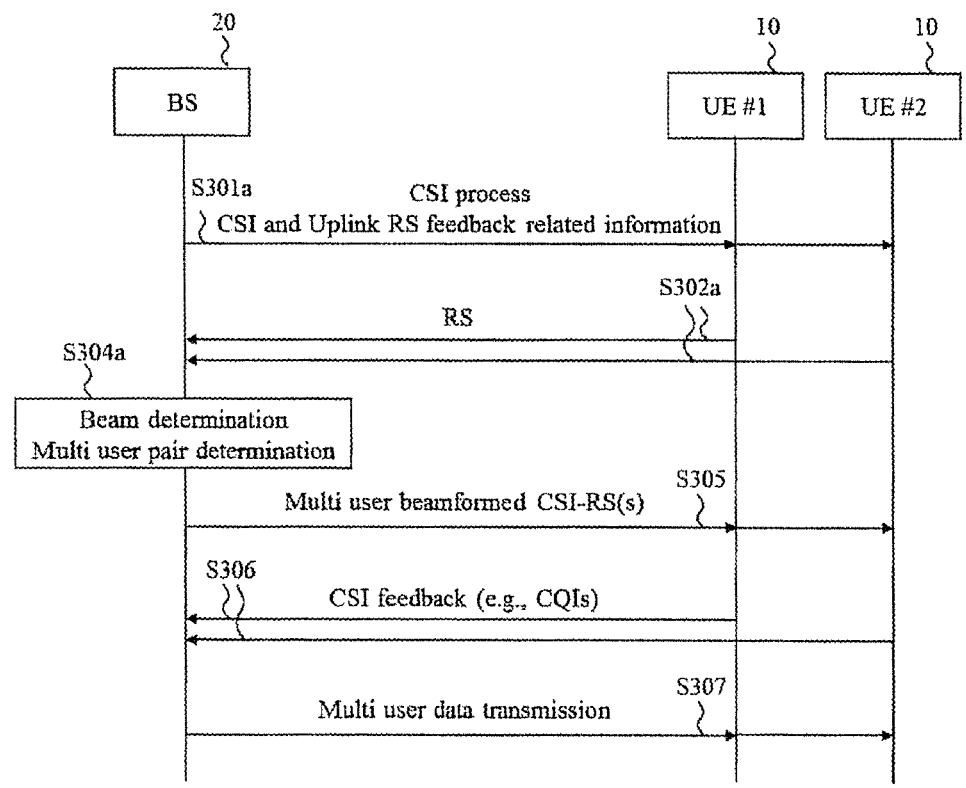
FIG. 11 is a sequence diagram showing an example operation for CSI estimation in consideration of interference between UEs by beamformed CSI-RSs where a precoder is determined based on channel reciprocity according to one or more embodiments of a third modified example of the present invention.

FIG. 11 is a sequence diagram showing an example operation for CSI estimation in consideration of interference between the UEs 10 by beamformed CSI-RSs where the precoder is determined based on channel reciprocity according to one or more embodiments of a third modified example of the present invention. Similar steps in FIG. 11 to steps in FIG. 9 may have the same reference labels and explanations thereof will be omitted.

As shown in FIG. 11, the BS 20 may transmit the CSI process information (CSI and Uplink RS feedback related information) to the UEs 10 (UE #1 and UE #2) (step S301). The UEs 10 (UE #1 and UE #2) may transmit the RS to the BS 20 (step S302a). The BS 20 may determine the precoder based on the channel reciprocity of the received RS and then determine the beam used for the downlink MIMO transmission (step S303a). Steps after the step S303a in FIG. 11 are the same as the steps in FIG. 9.

Thus, according to one or more embodiments of the third modified example of the present invention, the BS 20 may transmit the MU BF CSI-RSs to measure the interference between the UEs to the UE 10 after the beam determination of the multiple users based on the channel reciprocity, and as a result, it may be possible to perform the CSI estimation in consideration of the interference between UEs in the MU-MIMO transmission.

Another Example of the Third Example

The CSI estimation according to one or more embodiments of the third and the third modified examples of the present invention uses the BF CSI-RS, but the present invention is not limited to thereto. For example, the CSI estimation may use the CSI-RS and the PMI (or beam control information such as the CRI). In such case, the PMI may be the PMI for its own user equipment and include the PMI for other user equipment.

Fourth Example

Embodiments of a fourth example of the present invention will be described in detail below. CSI reporting in Rel. 13 LTE supports both periodic CSI reporting and the aperiodic CSI reporting based on a single CSI-RS configuration. However, for example, when both the periodic CSI reporting and the aperiodic CSI reporting are supported, power consumption in the UE may increase.

On the other hand, for example, only the periodic CSI reporting of which the period is long may be sufficient for the rough CSI such as the CRI. Furthermore, for example, if the aperiodic CSI reporting in addition to the periodic CSI reporting in the rough CSI, the number of Down Link Control Information (DCI) bits, downlink RS overhead, and CSI feedback overhead may be further consumed.

Furthermore, the periodic CSI reporting may be performed with high frequency, load of the UE may increase. On the other hand, in the aperiodic CSI reporting, the CSI may be calculated only when the trigger has occurred.

Furthermore, operation of a resource pool of the UE-specific CSI-RS may be mainly effective in the aperiodic CSI reporting.

Figure 12:
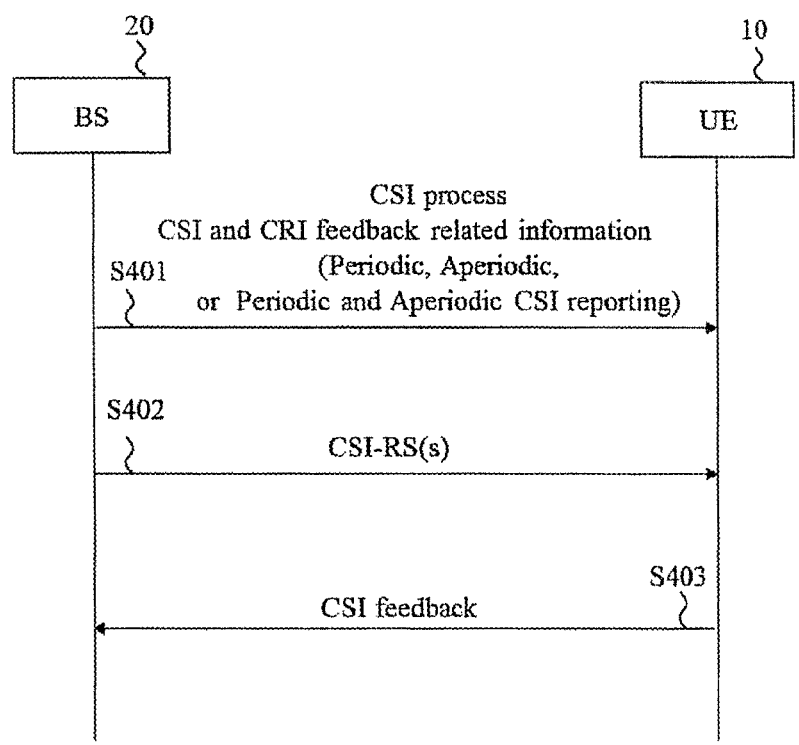
FIG. 12 is a sequence diagram showing an example operation for CSI feedback transmission based on designation periodic, aperiodic, or periodic and the aperiodic CSI reporting according to one or more embodiments of a fourth example of the present invention.
Figure 13A:
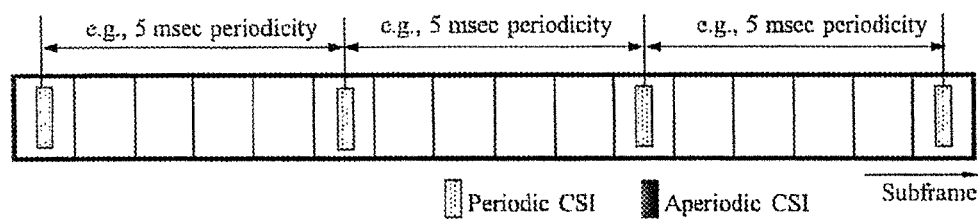
FIG. 13A is a diagram showing an example of CSI feedback where periodic CSI reporting is designated according to one or more embodiments of the fourth example of the present invention.
Figure 13B:
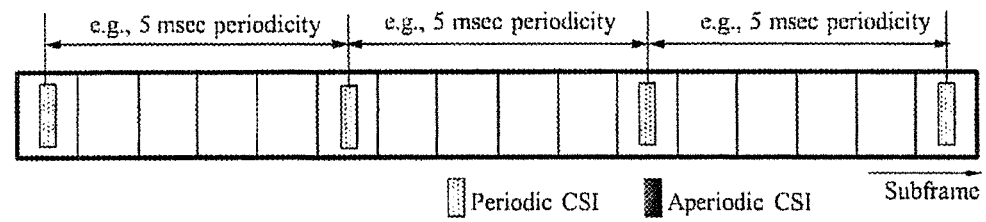
FIG. 13B is a diagram showing an example of CSI feedback where aperiodic CSI reporting is designated according to one or more embodiments of the fourth example of the present invention.
Figure 13C:
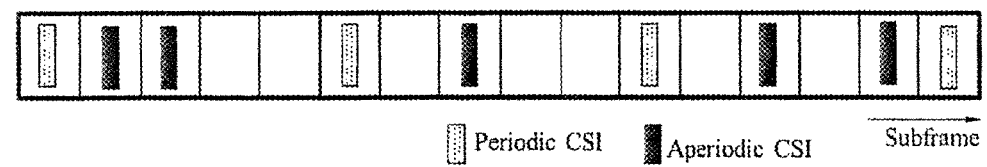
FIG. 13C is a diagram showing an example of CSI feedback where periodic and the aperiodic CSI reporting is designated according to one or more embodiments of the fourth example of the present invention.

Therefore, according to one or more embodiments of the fourth example of the present invention, in the CSI-RS reporting for a single CSI process of the CSI-RS, at least one of the periodic CSI reporting and the aperiodic CSI reporting may be designated. FIG. 12 is a sequence diagram showing an example operation for CSI feedback transmission based on designation periodic, aperiodic, or periodic and the aperiodic CSI reporting according to one or more embodiments of a fourth example of the present invention.

As shown in FIG. 12, the BS 20 may set the single CSI process. Then, the BS 20 may transmit the CSI process information (CSI and CRI feedback related information) including information to designate a transmission period of the CSI reporting to the UE 10 (step S401). The information to designate a transmission period of the CSI reporting may be information indicating the periodic CSI reporting, the aperiodic CSI reporting, or the periodic and the aperiodic CSI reporting. For example, the CSI process information may be notified, from the BS 20 to the UE 10, using the higher layer signaling, the lower layer signaling, or the combination of the higher layer signaling and the lower layer signaling.

In one or more embodiments of the fourth example of the present invention, the designated transmission period of the CSI reporting has three patterns of the periodic CSI reporting, the aperiodic CSI reporting, and the periodic and the aperiodic CSI reporting, but the designated transmission period of the CSI reporting may have two patterns of the periodic CSI reporting and the aperiodic CSI reporting.

Fourth Modified Example

According to one or more embodiments of a fourth modified example of the present invention, for example, at least one of one or more periodic CSI reporting and one or more aperiodic CSI reporting may be designated for the single CSI process set by the BS 20. The UE 10 may transmit the CSI feedback based on at least one of one or more periodic CSI reporting and one or more aperiodic CSI reporting of the received CSI process information to the BS 20.

According to one or more embodiments of the fourth modified example of the present invention, for example, when both the periodic CSI reporting and the aperiodic CSI reporting are supported in the single CSI process, the CSI estimation and the CSI reporting may be performed based on conditions of which the periodic CSI reporting and the aperiodic CSI reporting are different from each other. For example, the AP assumed in the periodic CSI reporting may differ from the AP assumed in the aperiodic CSI reporting. For example, for the rough channel estimation in the periodic CSI reporting, the CSI estimation and the CSI reporting may be performed based on the relatively small number of the APs. On the other hand, for the detailed channel estimation in the aperiodic CSI reporting, the CSI estimation and the CSI reporting may be performed based on the relatively large number of APs. In such case, the number of APs may be switched based on the same CSI-RS resource configuration in the periodic and the aperiodic CSI reporting. That is, the CSI-RS resource for the periodic CSI reporting may be included in the CSI-RS resource for the aperiodic CSI reporting.

Fifth Example

Embodiments of a fifth example of the present invention will be described in detail below. For example, coverage of the downlink RSs may be not sufficient according to an operating frequency in the wireless communication system 1. Furthermore, when the result of the channel estimation is not used for the beam determination like one or more embodiments of the first example of the present invention, (for example, when the beam determination may be performed based on the received power), a required CSI-RS insertion density may be relatively low compared to the beam determination using the result of the channel estimation. Furthermore, when the UE-specific CSI-RS (or other RSs) is assumed, it may be effective to change a multiplex density of the CSI-RS according to a user (UE)'s location and moving speed.

Figure 14A:
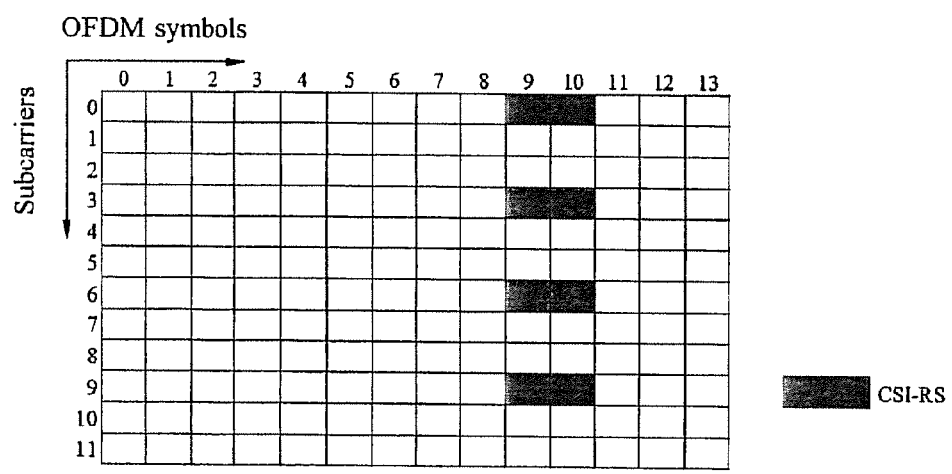
FIG. 14A is a diagram showing an example of a CSI-RS arrangement configuration (1) according to one or more embodiments of a fifth example of the present invention.
Figure 14B:
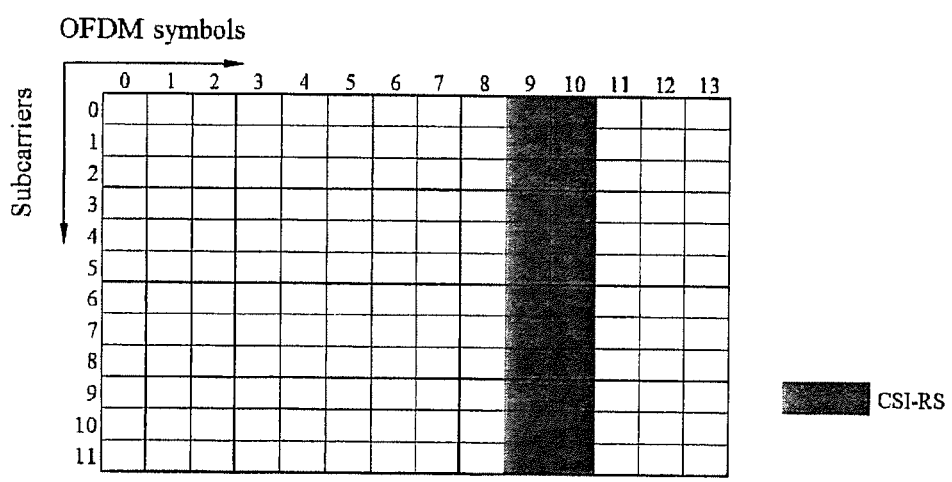
FIG. 14B is a diagram showing an example of a CSI-RS arrangement configuration (2) according to one or more embodiments of the fifth example of the present invention.

According to one or more embodiments of the fifth example of the present invention, the downlink RSs (e.g., CSI-RS) of which each of insertion densities differs from each other may be defined. For example, the BS 20 may switch the CSI-RS insertion densities semi-statically or statically. FIGS. 14A and 14B are a diagram showing an example of a CSI-RS arrangement configuration (1) and (2) according to one or more embodiments of the fifth example of the present invention, respectively. In an example of FIG. 14A, for example, in the ninth and tenth Orthogonal Frequency-Division Multiplexing (OFDM) symbols from the beginning of a subframe, the CSI-RS may be arranged at every three subcarriers. In an example of FIG. 14B, for example, in the ninth and tenth OFDM symbols from the beginning of the subframe, the CSI-RS may be arranged at all subcarriers.

According to one or more embodiments of the fifth example of the present invention, for example, the BS 20 may, semi-statically or dynamically, switch the CSI-RS arrangement configuration in FIG. 14A and the CSI-RS arrangement configuration in FIG. 14B, which have different CSI-RS insertion densities. Furthermore, the switched CSI-RS insertion densities (arrangement configurations) is not limited to examples of the configurations in FIGS. 14A and 14B, but the CSI-RS arrangement configurations may be switched so that a CSI-RS frequency density or time density becomes a predetermined density, for example.

In one or more embodiments of the fifth example of the present invention, for example, a plurality of CSI-RSs may be configured as a pair (or group) and the CSI-RSs configured as the pair (or group) may be used for the single CSI-RS estimation (Resource Element matching).

In one or more embodiments of the fifth example of the present invention, so that the CSI-RS insertion density decreases, for example, the division number of the set CSI-RS may be notified. Furthermore, for example, the independent CSI different according to the division number of the CSI-RS may be estimated.

For example, when the CSI-RS insertion density increases or decreases as above, the UE 10 may assume that power per resource element (RE) is the same. For example, when the CSI-RS insertion density doubles, it may be assumed that the total CSI-RS transmission power doubles. Furthermore, information of the CSI-RS transmission power different according to the different insertion densities may be set.

Fifth Modified Example

According to one or more embodiments of a fifth modified example of the present invention, the downlink RSs of which each transmission power differs from each other may be defined. For example, the transmission power of the downlink RS may be changed semi-statically or dynamically. For example, the BS 20 may notify the UE 10 of a change of the transmission power of the downlink RS simultaneously with a CSI request.

Another Example of the Fifth Example

Rel. 13 LTE defines the UE-specific CSI feedback based on Measurement Restriction (MR). However, when the MR is enabled to be performed, the UE 10 needs to perform the CSI estimation based on the single subframe, and as a result, accuracy of the channel estimation may decrease.

According to one or more embodiments of another example of the fifth example of the present invention, the switch of the CSI-RS insertion densities in one or more embodiments of the fifth example of the present invention may be determined based on information on the MR. For example, when the MR is enabled to be performed, the UE 10 may receive the CSI-RS by assuming the RS with the high density is multiplexed.

Furthermore, according to one or more embodiments of another example of the fifth example of the present invention, the MR is not limited to the MR defined in Rel. 13 LTE, an average value per time of results of the channel estimation may be dynamically reset. In such case, the UE may switch an assumption of the CSI-RS insertion density according to a trigger of the reset for the average value per time.

Sixth Example

Embodiments of a sixth example of the present invention will be described in detail below. In LTE and LTE-A, a Sounding Reference Signal (SRS) is multiplexed in a Single Carrier-Frequency Division Multiple Access (SC-FDMA) symbol, and as a result, a sufficient transmission power density may not be secured (that is, transmission cannot be performed in the broad band). The SRS is used for the channel estimation and Doppler estimation.

According to one or more embodiments of the sixth example of the present invention, the channel estimation and the Doppler estimation may use the division-multiplexed SRS in a plurality of SC-FDMA symbols. However, it may not be required that a plurality of the SRS REs are arranged in the same frequency location. Examples of division-multiplexed SRS arrangement configurations in a plurality of the SC-FDMA symbols will be described with reference to FIGS. 15A to 15F. Examples of FIGS. 15A to 15F may be SRS arrangement configurations where SRS REs are arranged in a unit of subcarriers to SC-FDMA symbols. However, for example, those examples may be applied to SRS arrangement configurations where SRS REs are arranged in a unit of the frequency to time such as a unit of Resource blocks (RBs) to subframes.

Furthermore, it may not be required to transmit the SRSs in an entire system bandwidth repeatedly for the Doppler estimation. Therefore, in the example of the arrangement configuration in FIG. 15A, for example, the division-multiplexed SRSs may not be arranged in the entire system bandwidth and the SRSs arranged in a subcarrier per SC-FDMA symbol may be arranged in a pair of SC-FDMA symbols. For the Doppler estimation, the arrangement configuration in FIG. 15A may realize a narrower bandwidth by dividing the system bandwidth by (the number of symbols−1).

Figure 15A:
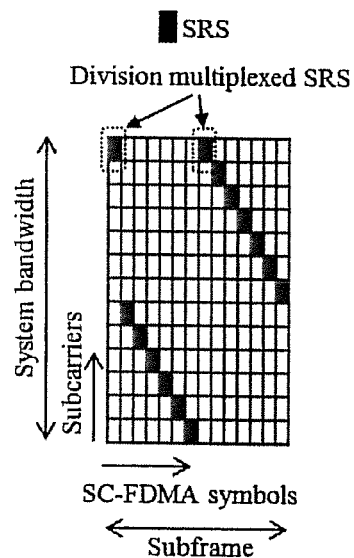
FIG. 15A is a diagram showing an example of a division-multiplexed SRS arrangement configuration (1) according to one or more embodiments of a sixth example of the present invention.
Figure 15B:
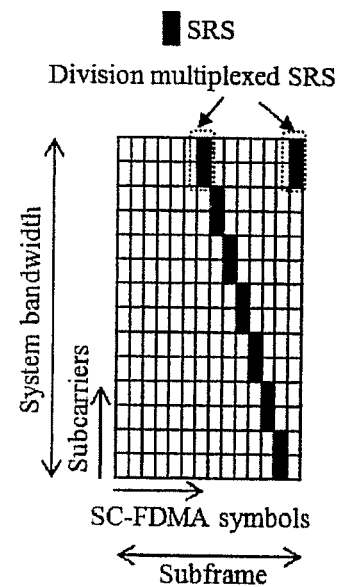
FIG. 15B is a diagram showing an example of a division-multiplexed SRS arrangement configuration (2) according to one or more embodiments of the sixth example of the present invention.

According to an example of an arrangement configuration in FIG. 15B, the division-multiplexed SRSs may not be arranged in the entire system bandwidth and the SRSs arranged in two subcarriers per SC-FDMA symbol may be arranged in a pair of SC-FDMA symbols. According to the arrangement configuration in FIG. 15B, the SRSs can be multiplexed in both odd slot and even slot.

Figure 15C:
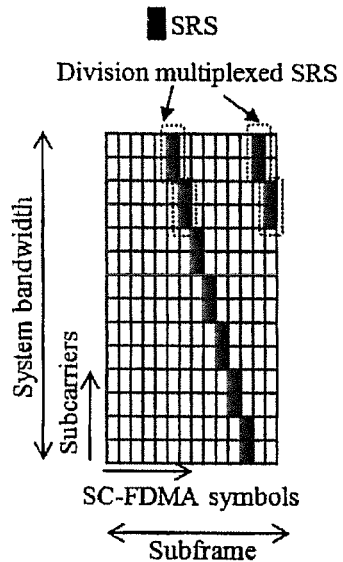
FIG. 15C is a diagram showing an example of a division-multiplexed SRS arrangement configuration (3) according to one or more embodiments of the sixth example of the present invention.

According to an example of an arrangement configuration in FIG. 15C, the division-multiplexed SRSs may not be arranged in the entire system bandwidth and the SRSs arranged in two subcarriers per SC-FDMA symbol may be arranged in two pairs of SC-FDMA symbols.

Figure 15D:
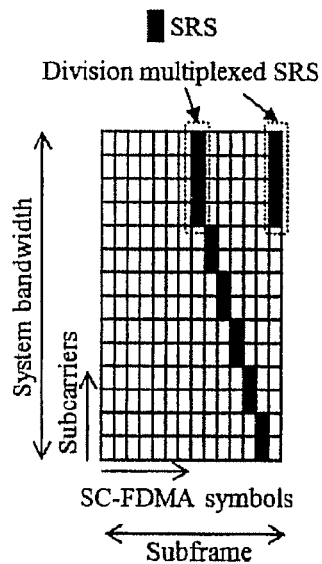
FIG. 15D is a diagram showing an example of a division-multiplexed SRS arrangement configuration (4) according to one or more embodiments of the sixth example of the present invention.

According to an example of an arrangement configuration in FIG. 15D, the division-multiplexed SRSs may not be arranged in the entire system bandwidth and the SRSs may be arranged in a subcarrier and a pair of SC-FDMA symbols.

Figure 15E:
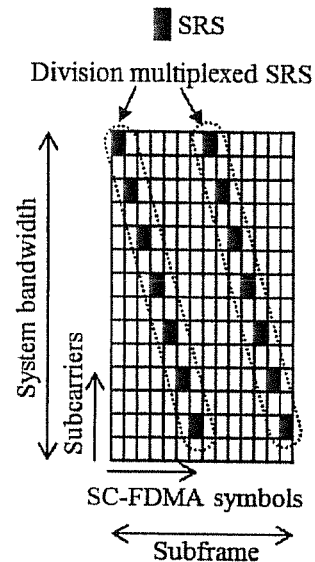
FIG. 15E is a diagram showing an example of a division-multiplexed SRS arrangement configuration (5) according to one or more embodiments of the sixth example of the present invention.

A SRS time density of the examples in FIGS. 15A to 15D increases compared to a SRS time density of the conventional configuration. Therefore, even if the SRS frequency density decreases, the accuracy of the channel estimation equal to that of the conventional channel estimation can be secured. In the example of the SRS arrangement configuration in FIG. 15E, the division-multiplexed SRSs may not be arranged in the entire system bandwidth and the SRSs arranged in a subcarrier per SC-FDMA symbol may be arranged in only predetermined subcarriers in the system bandwidth. As shown in FIG. 15E, for example, the subcarriers in which the SRSs are arranged may be arranged alternately in a frequency direction. For example, when the high accurate channel estimation is not required, the SRS arrangement configuration in FIG. 15E can reduce the SRS insertion density. For example, the subcarriers in which the SRSs are arranged may be arranged in alternate RBs in the frequency direction.

Figure 15F:
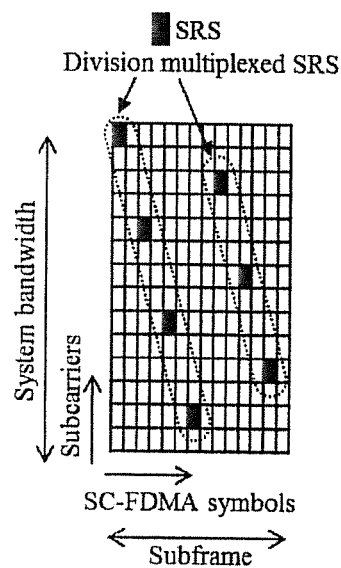
FIG. 15F is a diagram showing an example of a division-multiplexed SRS arrangement configuration (6) according to one or more embodiments of the sixth example of the present invention.

As shown in FIG. 15F, an example of the SRS arrangement configuration, for example, division-multiplexed SRSs, may not be arranged in the entire system bandwidth and the same subcarrier.

As another example of the SRS arrangement configuration, to decrease the SRS insertion density, for example, high-order comb multiplexing such as comb-4 may be applied to the SRS arrangement configuration.

For example, to perform the proper Doppler estimation, it may be required that gaps of the division-multiplexed SRSs (gaps of a pair of SC-FDMA symbols multiplexing the SRSs) in a SRS time axis (subframe direction) are appropriately configured. Therefore, as another example of the SRS arrangement configuration, predetermined gaps of a pair of SC-FDMA symbols in which the division-multiplexed SRSs are arranged may be configured. For example, gaps of the multiplexed SRSs in the time axis may be the number of SC-FDMA symbols, slots, or subframes.

For example, a subframe length in the 5G radio access technology may be shorter than a subframe length in LTE. Therefore, in the 5G system, for the Doppler estimation, it may be better to change the legacy configuration of the SRSs time-multiplexed in the single subframe. In FIG. 15A, the division-multiplexed SRSs may be multiplexed to use the Doppler estimation especially. As another example of the SRS arrangement configuration, for example, the SRSs may be multiplexed in a plurality of subframes and then the multiplexed SRSs may be transmitted.

As another example of the SRS arrangement configuration, for example, locations of the SRSs in a frequency direction in each SC-FDMA symbol (locations of subcarriers in which the SRSs are arranged) may be hopped at random. For example, locations of subcarriers in which the SRSs are arranged may be hopped based on a Cell ID, a Virtual Cell ID (VCID), and a Beam ID (BID). The BID is an ID to identify each beam used for the beamforming (or each cell formed by each beam).

As another example of the SRS arrangement configuration, for example, to reduce controlling delay, the SRSs may be arranged to be multiplexed in a second half of the subframe.

As another example of the SRS arrangement configuration, for example, to improve accuracy of the channel estimation, the SRS for the channel estimation may be arranged to be multiplexed in the symbols behind the symbols in which the SRS for the Doppler estimation is arranged.

As another example of the SRS arrangement configuration, only a part of the SRSs for the Doppler estimation may be inserted. For example, absence or presence of the SRSs for the Doppler estimation may be periodically switched. Furthermore, for example, the absence or presence of the SRSs for the Doppler estimation may be triggered.

As another example of the SRS arrangement configuration, when the rough channel estimation such as the estimation of the direction of arrival is performed, the SRSs may not be transmitted from all antennas of the UE 10. For example, the number of transmission APs of the SRSs may be switched using at least one of the higher layer signaling and the lower layer signaling.

For example, for overhead reduction, the channel estimation after precoding multiplication, and ensuring coverage, the division-multiplexed SRSs above may be precoded. Furthermore, for example, absence or presence of precoding the SRS may be switched. For example, the precoder applied to the SRS may be semi-statically or dynamically switched. Furthermore, the precoder applied to the SRS may be transmitted simultaneously with an uplink data signal. Furthermore, the UE 10 may notify the BS 20 of the precoder applied to the SRS.

Furthermore, SRS locations in the SC-FDMA symbols and subcarriers and the bandwidth in which the SRS is transmitted (the number of used subcarriers per SC-FDMA symbol) are not limited to examples of the arrangement configurations in FIGS. 15A to 15E, but the SRS arrangement configuration may be a predetermined arrangement configuration based on regularity of the examples in FIGS. 15A to 15E.

Another Example of the Sixth Example

According to one or more embodiments of another example of the sixth example of the present invention, regarding SRS sequence generation and mapping, at least one of parameters supported in Rel. 13 LTE and locations in which the SRS is multiplexed in the frequency direction. Furthermore, the parameter for the channel estimation and the parameter for the Doppler estimation may be independently configured in the parameters supported in Rel. 13 LTE. For example, the SRS transmission period for the Doppler estimation may be multiples of the SRS transmission period for the channel estimation.

According to one or more embodiments of another example of the sixth example of the present invention, the SRS sequence generation and mapping may be determined based on at least one of the Cell ID, the VCID, and the BID.

According to one or more embodiments of another example of the sixth example of the present invention, transmission power for SRS transmission may be determined based on power density relative to the PUSCH.

Seventh Example

Embodiments of a seventh example of the present invention will be described in detail below. According to one or more embodiments of the seventh example of the present invention, the channel estimation using a Demodulation reference signal (DMRS) may be performed. For example, transmission of only DMRS which does not have a data signal may be triggered. For example, multiplexed locations (time and frequency) and/or codes of the DMRS may be triggered.

According to one or more embodiments of the seventh example of the present invention, when the channel estimation is performed using the DMRS before the precoding, for example, the DMRS may not be precoded. For example, when the transmission of only the DMRS is triggered as above precoding the DMRS may be implicitly invalidated. Furthermore, absence or presence of precoding the DMRS may be notified using at least one of the higher layer signaling and the lower layer signaling.

According to one or more embodiments of the seventh example of the present invention, for example, when the rough channel estimation such as the estimation of the direction of arrival is performed, the DMRS may not be transmitted from all antennas of the UE 10. For example, the number of transmission APs of the DMRSs may be switched using at least one of the higher layer signaling and the lower layer signaling. Furthermore, the APs applied to the DMRSs for the channel estimation may be implicitly or explicitly configured.

According to one or more embodiments of the seventh example of the present invention, for example, for overhead reduction, the channel estimation after precoding multiplication, and ensuring coverage, the DMRS may be precoded. For example, absence or presence of precoding the DMRS may be switched. For example, the precoder applied to the DMRS may be semi-statically or dynamically switched. Furthermore, the precoder applied to the DMRS may be transmitted simultaneously with the uplink data signal. Furthermore, the UE 10 may notify the BS 20 of the precoder applied to the DMRS.

According to one or more embodiments of the seventh example of the present invention, transmission power of the DMRS may differ from power during decoding data by the DMRS. For example, the transmission power (density) of the DMRS may be identical with the transmission power of the SRS. For example, the transmission power of the DMRS may be defined based on an offset from power of the SRS (or PUSCH). For example, when the DMRS for the channel estimation is triggered, the transmission power of the DMRS may be switched. For example, the transmission power of the DMRS may be semi-statically or dynamically notified.

Configuration of Base Station

Figure 16:
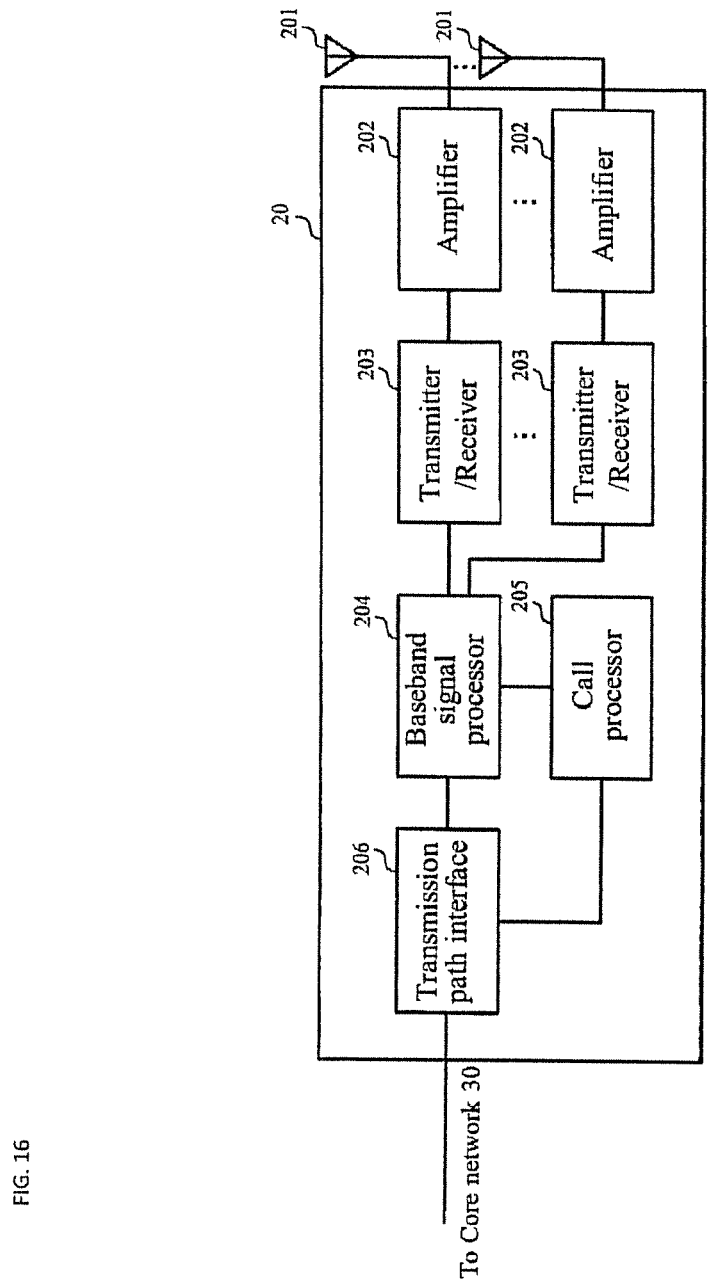
FIG. 16 is a block diagram showing a schematic configuration of the base station according to one or more embodiments of the present invention.

The BS 20 according to one or more embodiments of the present invention will be described below with reference to FIG. 16 a diagram illustrating schematic configuration of the BS 20 according to one or more embodiments of the present invention. The BS 20 may include a plurality of antennas 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

Configuration of User Equipment

Figure 17:
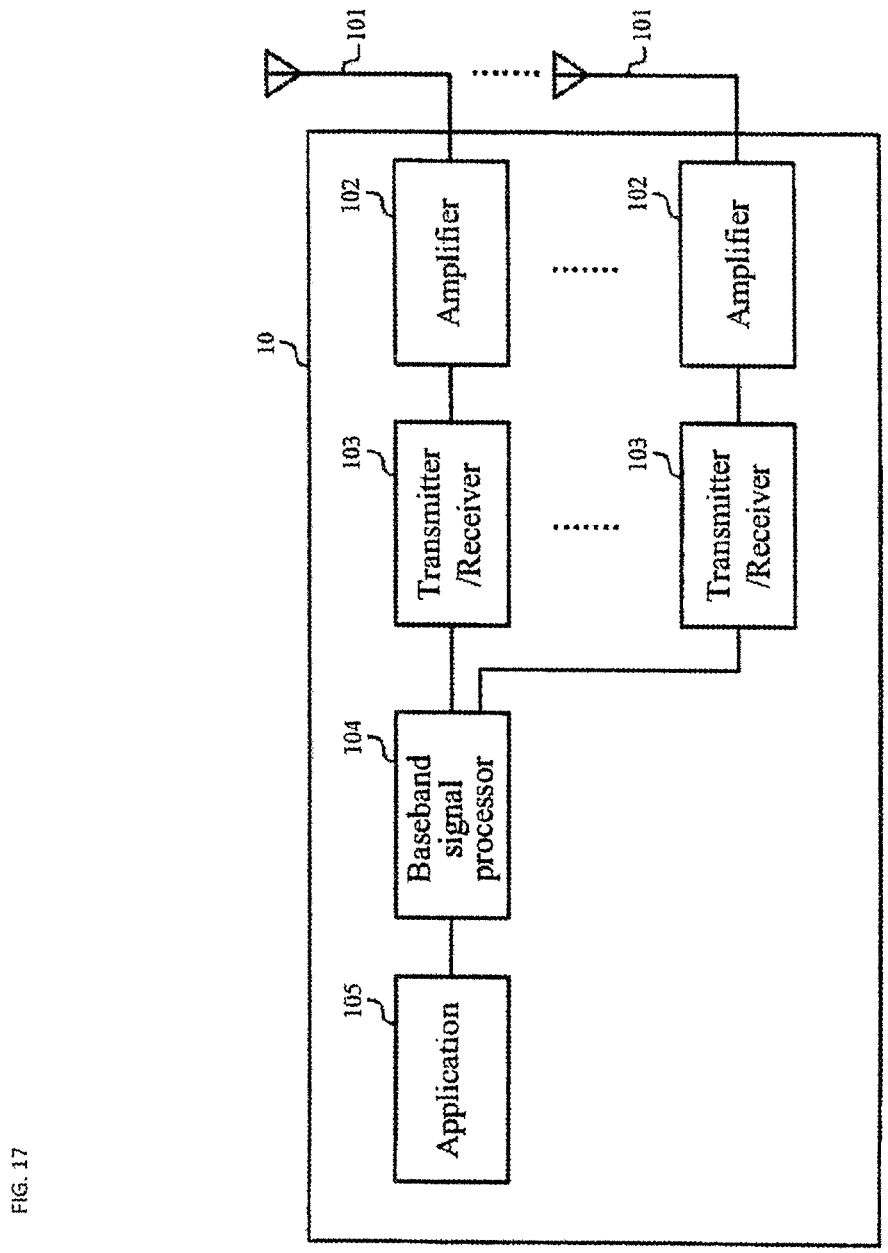
FIG. 17 is a block diagram showing a schematic configuration of the user equipment according to one or more embodiments of the present invention.

The UE 10 according to one or more embodiments of the present invention will be described below with reference to FIG. 17, a diagram illustrating an overall configuration of the UE 10. The UE 10 has a plurality of UE antennas 101, amplifiers 102, transceiver (transmitter/receiver) 103, a baseband signal processor 104, and an application 105.

As for DL, radio frequency signals received in the UE antennas 101 are amplified in the respective amplifiers 102, and subjected to frequency conversion into baseband signals in the transmission/reception sections 103. These baseband signals are subjected to reception processing such as FFT processing, error correction decoding and retransmission control and so on, in the baseband signal processor 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the baseband signal processor 104. In the baseband signal processor 104, retransmission control (Hybrid ARQ) transmission processing, channel coding, precoding, DFT processing, IFFT processing and so on are performed, and the resultant signals are transferred to each transceiver 103. In the transceiver 103, the baseband signals output from the baseband signal processor 104 are converted into a radio frequency band. After that, the frequency-converted radio frequency signals are amplified in the amplifier 102, and then, transmitted from the antenna 101.

One or more embodiments of the present invention may also apply to not only downlink transmission but also uplink transmission.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A and a newly defined channel and signaling scheme.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Explanation of References

1 Wireless communication system
10 User equipment (UE)
101 Antenna
102 Amplifier
103 Transceiver (transmitter/receiver)
104 Baseband signal processor
105 Application
20 base station (BS)
201 Antenna
202 Amplifier
203 Transceiver (transmitter/receiver)
204 Baseband signal processor
205 Call processor
206 Transmission path interface

What is claimed is:

1. A user equipment (UE) comprising:
a receiver that receives, from a base station (BS):
Channel State Information (CSI)-Reference Signals (RSs) that comprise a CSI-RS and one or more remaining CSI-RSs; and
information on interference measurement; and
a processor that measures CSI for the CSI-RS,
wherein, in a case of aperiodic CSI feedback, when the processor measures, based on the information, CSI for the CSI-RS, the processor determines, based on the information, that only the one or more remaining CSI-RSs among the received CSI-RSs are used for interference measurement.

2. A wireless communication method comprising:
transmitting, from a base station (BS) to a user equipment (UE), Channel State Information (CSI)-Reference Signals (RSs) that comprise a CSI-RS and one or more remaining CSI-RS s;
transmitting, from the BS to the UE, information on interference measurement; and
measuring, with the UE, CSI for the CSI-RS,
wherein, in a case of aperiodic CS feedback, when measuring, based on the information, CSI for the CSI-RS, the UE determines, based on the information, that only the one or more remaining CSI-RSs among the received CSI-RSs are used for interference measurement.

3. A base station (BS) comprising:
a processor, wherein when, in a case of aperiodic feedback, a user equipment (UE) measures, based on information on interference measurement, a Channel State Information (CSI) for a CSI-Reference Signal (RS) of CSI-RSs, which comprise the CSI-RS and one or more remaining CSI-RSs, the processor controls to transmit the information to determine that only the one or more remaining CSI-RSs among the received CSI-RSs are used for interference measurement; and
a transmitter that transmits, to the UE, the CSI-RSs and the information.

4. A system comprising a base station (BS) and a user equipment (UE), wherein:
the BS comprises:
a processor, wherein when, in a case of aperiodic feedback, the UE measures, based on information on interference measurement, a Channel State Information (CSI) for a CSI-Reference Signal (RS) of CSI-RSs, which comprise the CSI-RS and one or more remaining CSI-RSs, the processor controls to transmit the information to determine that only the one or more remaining CSI-RSs among the received CSI-RSs are used for interference measurement; and a transmitter that transmits, to the UE, the CSI-RSs and the information, and the UE comprises:
  a receiver that receives, from the BS:
    the CSI-RSs; and
    the information; and
  a processor that measures CSI for the CSI-RS,
  wherein, in a case of aperiodic CSI feedback, when the processor of the UE measures, based on the information, CSI for the CSI-RS, the processor of the UE determines, based on the information, that only the one or more remaining CSI-RS s among the received CSI-RSs are used for interference measurement.

* * * * *